July 23, 1957    A. C. AVRIL    2,800,337
SAFETY DEVICE FOR HAND TRUCKS
Filed June 2, 1954    2 Sheets-Sheet 1
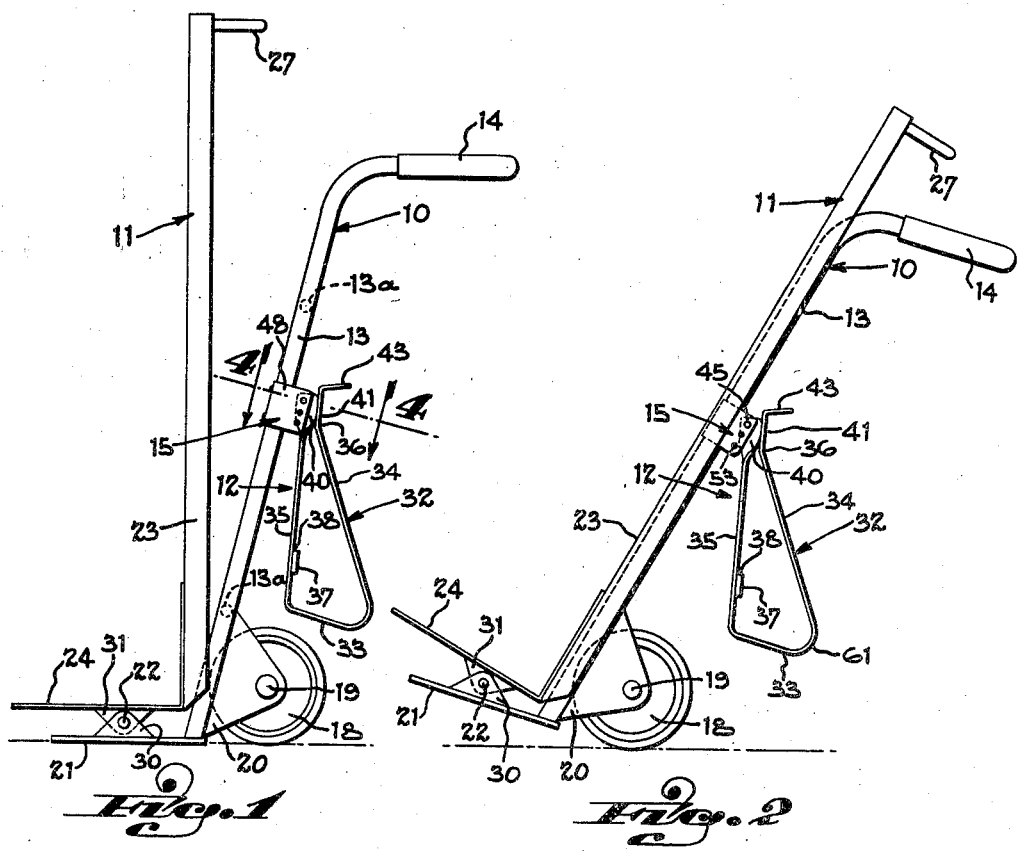
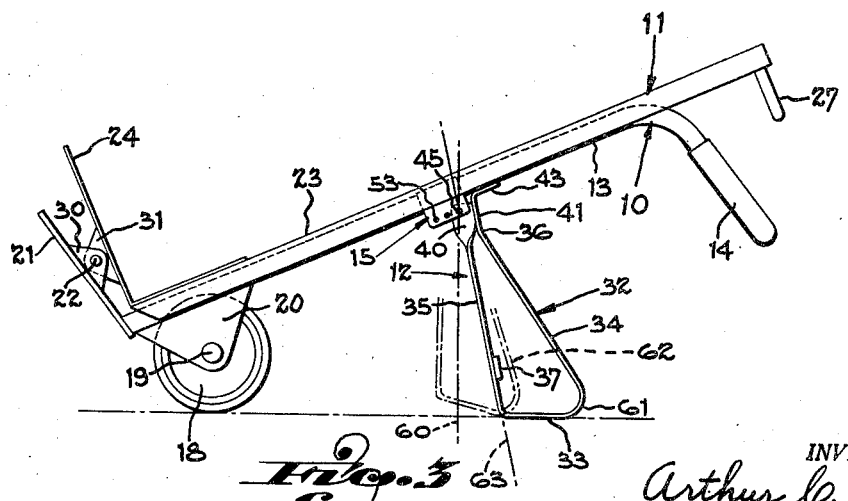
INVENTOR.
Arthur C. Avril.
BY
Wood, Herron & Evans.
ATTORNEYS.

July 23, 1957  A. C. AVRIL  2,800,337
SAFETY DEVICE FOR HAND TRUCKS
Filed June 2, 1954  2 Sheets-Sheet 2
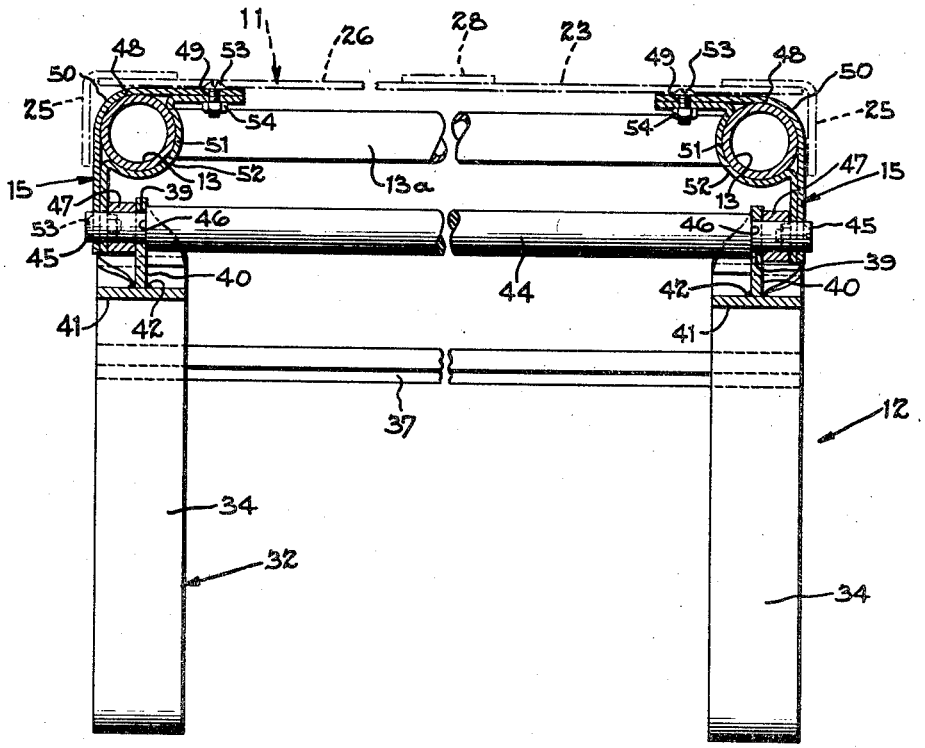
Fig. 4
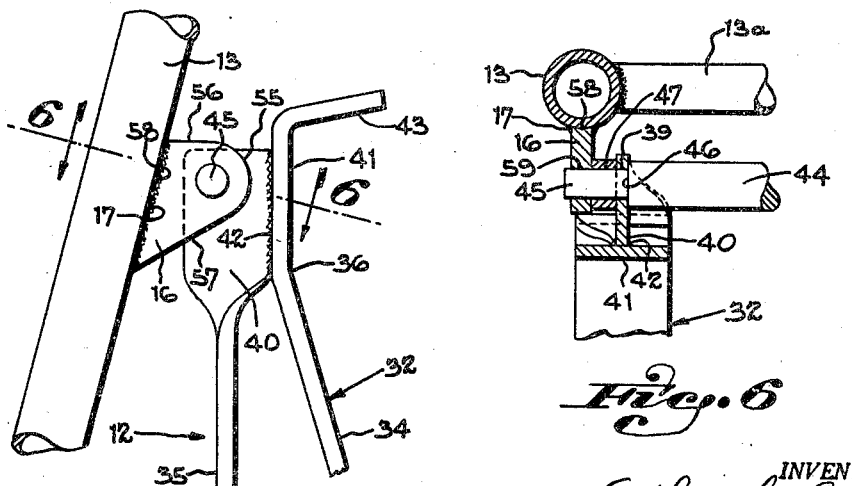
Fig. 5
Fig. 6
INVENTOR.
Arthur C. Avril.
BY
Wood, Herron & Evans
ATTORNEYS.

United States Patent Office 2,800,337
Patented July 23, 1957

2,800,337

SAFETY DEVICE FOR HAND TRUCKS

Arthur C. Avril, Wyoming, Ohio

Application June 2, 1954, Serial No. 433,953

3 Claims. (Cl. 280—47.33)

This invention relates to hand trucks which are used in transporting heavy stacks of merchandise and is directed in particular to a safety device for protecting the user of the truck in case of accident.

The invention is disclosed in relation to the hand truck shown in the patent to Arthur C. Avril, No. 2,432,368; however, it will be understood that the safety device also is intended for conventional hand trucks. Essentially, a hand truck consists of a frame including hand grips at an upper end and wheels at its lower end, together with support means to engage a stack of merchandise. During transport, the truck is inclined rearwardly with the stacks resting against the frame, the weight load being imposed upon the wheels. The truck user maintains the load in balanced condition upon the wheels as he pushes the truck.

In transporting the loaded truck, it is possible that the user may fail to keep the truck in balance or that he may slip and fall. In this case, the truck may fall upon the user and injure him, especially if the load is heavy.

One of the primary objects of the invention has been to provide a safety device in the form of a landing gear on the truck which normally does not interfere in any way with the user but which, in the event the truck is dropped, extends itself to a position for engaging the floor and supporting the truck in an inclined position to prevent injury to the user or to the truck itself.

Briefly, the safety device consists of a pair of support props, one for each side bar of the truck, the props being pivotally suspended from an intermediate position along the length of the side bars at the rearward side thereof. The props are generally of triangular configuration as viewed from the side, the vertex of the triangle being pivotally connected to the side bar while its base, which normally resides above the floor, contacts the floor to support the truck in an inclined position when it is dropped. The configuration of the support props has been carefully worked out to provide a center of gravity which causes the props to hang freely in a normally retracted position which does not interfere with the user.

The configuration and pivot mounting of the props causes them to swing forwardly to a retracted position closely adjacent the truck when it assumes its generally vertical loading position to allow the operator to manipulate the loading cradle conveniently. When the loaded truck is inclined rearwardly to its transport position, the props swing outwardly a greater distance but still do not form an obstruction, since the user has then moved rearwardly from the cradle. In case the operator loses control and drops the truck, then the props swing outwardly to a fully extended position to support the truck upon the floor in a reclining position, a sufficient space being created between the floor and truck to protect the operator if he should fall with part of his body beneath the truck.

A further object of the invention has been to provide a prop configuration which swings itself outward to fully extended self-locking position in the event that the prop is not fully extended upon contacting the floor.

To accomplish this, the base of each prop is inclined and has a portion extending rearwardly beyond an axis of gravity passing through its pivot point. Upon contacting the floor, the base configuration and relationship of the pivot point creates a turning moment in a direction to force the truck forwardly, at the same time, pivoting the prop rearwardly until the base is flat on the floor to stabilize the prop. In this position, it is locked by stop means and supports the truck firmly.

The present structure is intended to be mounted upon existing hand trucks as an attachment and also to be mounted permanently upon new trucks at assembly. The landing gear itself is the same in either case; however, a detachable clamping bracket is utilized for mounting the structure as an attachment, while a mounting lug is welded directly to the truck for permanent attachment upon new trucks.

Various other features and advantages of the invention will be more fully apparent to those skilled in the art from the following detailed description taken in conjunction with the drawings.

In the drawings:

Figure 1 is a side elevation of a hand truck of the type shown in the aforesaid Avril patent equipped with the safety device, the truck being shown in its loading position. The safety device shown in this view is supplied as an attachment for installation upon existing trucks.

Figure 2 is a side elevation, similar to Figure 1, showing the truck in transport position.

Figure 3 is a similar side view showing the safety device in extended or landing position supporting the truck.

Figure 4 is a cross sectional view taken on line 4—4, Figure 1, further detailing the safety device.

Figure 5 is an enlarged fragmentary side view showing the welded mounting lug used in attaching the safety device permanently to a new truck.

Figure 6 is a cross sectional view taken on line 6—6, Figure 5, further illustrating the welded mounting lug.

The drawings disclose the safety device installed upon the hand truck of the aforesaid Avril patent; however, the device is mounted in the same manner upon conventional hand trucks. Referring to Figures 1 and 4, the frame of the truck is indicated generally at 10, the load cradle at 11, and the safety device at 12. Frame 10 consists of side bars 13—13 held in spaced relationship by transverse bars 13a. Handles 14 are provided at the upper ends of the side bars. The safety device 12 is attached to the side bars 13 by clamp brackets indicated generally at 15 which are mounted conveniently by the user upon an existing truck. When mounted by the manufacturer upon a new truck the safety device is mounted upon lugs 16—16 permanently welded to the side bars as indicated at 17 in Figures 5 and 6.

The truck includes wheels 18—18 journalled on axle 19 which is carried by brackets 20—20 of side bars 13. When the truck is not in use (Figure 1) it is stabilized by nose pieces 21—21 which support the cradle 11 for rocking movement.

Cradle 11 consists of back section 23 (Figure 4) including a load support plate 24 pivoted on shaft 22 which is journalled in brackets 30 and 31. The cradle further includes side angle irons 25—25 and cross bars 26. The top cross bar 26 includes a handle 27. A longitudinal bar 28 joins cross bars 26, the bars providing a backing for the stacked material when the cradle is tilted back to load carrying position (Figure 2).

The hand truck disclosed in the drawings has been selected to illustrate the utility of the safety device since it is intended particularly for transporting bags of heavy material in stack formation. The bags may be stacked upon the pallets and loaded by inserting the support plate 24 beneath the pallet, then rocking the cradle rearwardly to pick up the pallet and its load.

The safety device swings to retracted position during loading (Figure 1) and swings to arresting position after the truck is loaded, as shown in Figure 2. Accordingly, the safety device shifts itself out of the way during loading so as not to interefere with the movements of the user, but automatically extends itself to safety position when the user moves rearwardly to pick up the load and tilt the truck.

The stack of bags weighs in the neighborhood of 1000 pounds; to accommodate the stack, the cradle extends more than four feet above the floor. It will be evident, that in the absence of the safety device, the cradle or side bars may pin the truck user to the floor in case of accident during loading or transport. However, if the truck is equipped with the safety device, the user is protected, even if he should slip and fall since the safety device automatically extends itself and supports the truck above the floor as shown in Figure 3.

Described in detail, the safety device 12 is in the form of a landing gear consisting of a pair of props 32 which are pivotally suspended at their upper ends from the side bars 13 of the truck. The props hang in a generally perpendicular position by gravity, independently of the inclination of the side bars. Each prop is in the form of an oblique-angled triangle formed of flat metal stock bent to provide a base 33, a rearward side bar 34 and a forward side bar 35; the two side bars or legs terminate at the vertex as indicated at 36. The rearward side bar 34 is longer than the forward bar 35, such that the base 33 slopes upwardly and forwardly. The two props are joined together, for movement in unison, by a cross bar 37 which has its opposite ends welded as at 38 to the forward side bars 35.

The upper end portion of each forward side bar 35 is twisted to form a bearing pad 40 residing at right angles to the plane of the bar proper (Figure 5). The upper end portion of the rearward side bar is bent to provide the attachment portion 41 residing in contact with the edge of pad 40 and welded as at 42. The upper end of the attachment portion includes a stop 43 which is bent substantially at right angles to the attachment portion 41. The stop projects rearwardly and engages the side bar 13 to lock the prop at the limit of its outwardly extended position when the truck is fully lowered as shown in Figure 3.

The two props are pivotally suspended from the opposite ends of a pivot shaft 44, the end portions of the shaft being counterturned to provide stub shafts 45 delineating the respective shoulders 46 (Figure 4). The bearing pads 40 are provided with holes 39 loosely journalled on the stub shafts and the shoulders from abutments which are engaged by the bearing pads to hold the props in spaced relationship. The outer end portions of the stub shafts are pivotally journalled in the bearing brackets 15 or in the lugs 16 which are permanently welded to the side bars by the fabricator (Figure 5). A spacer collar 47 is loosely confined on each stub shaft between the bearing bracket and bearing pad.

Described with reference to Figure 4, the attachment bracket 15 comprises a two-piece clamp, formed of heavy gauge sheet metal, one clamp for each side bar 13. Each clamp consists of an exterior clamping plate 48, which, as viewed in Figure 4, is generally right angular in cross section having a curved section 50 corresponding to the diameter of the side bar 13. The second clamping plate 51, which nests against the interior surface of plate 48, is also generally right angular in cross section and includes a curved section 52 which embraces the opposite side of the side bar 13 such that the bar is clamped within the two curved sections.

The outer ends of the two plates are drawn forcibly into engagement with the side bar by the screws 53 passing through matching holes formed in the two plates and threaded into nuts 54. Upon assembly, the bearing pads of the props are placed upon the stub shafts, the spacers are slipped in place and the outer ends of the stub shafts are inserted in the matching holes 49 of the clamping plates 48 and 50. When the screws 53 are firmly tightened, the curved sections 50 and 52 forcibly and securely grip the side bar 13. It will be noted in Figure 3, that the impact force, developed when the hand truck is dropped, acts directly through the props and against the side bars, generally at right angles to the axis of the bars, such that there is no tendency to displace the clamp brackets.

Referring to Figure 5, the welded lug 16 is formed from a relatively thick steel plate having a curved outer end portion 55 and outwardly tapering side edges 56 and 57 to form a relatively long base 58 which creates a strong welded joint. Each lug is provided with a hole 59 to journal the stub shafts 45. The prop structure for the permanent apparatus is identical to the structure described above except that the pivot shaft is slightly shorter to compensate for the spacing of the welded lugs, which is slightly less than that provided by the clamp brackets.

The prop members are freely suspended from the side bars in order that they may swing normally to the retracted position, remote from the legs of the workman, so as to offer no interference with the normal utility of the truck. In other words, if they were mounted to project rigidly from the bars in a position corresponding to that shown in Figure 3, the props would make it impossible to handle the truck in the normal manner and would constitute a hazard. As shown in Figure 1, the props reside closely adjacent the side bars when the truck is in its loading position to allow the operator to manipulate the loading cradle conveniently. When the loaded truck is inclined rearwardly to its transport position (Figure 2) the props naturally swing outwardly a greater distance, but still do not create an obstruction since the user has then moved rearwardly from the cradle. In case the user loses control, the supports swing by gravity to the fully extended position shown in Figure 3.

The triangular configuration of the props has been carefully worked out to provide maximum strength and to locate their center of gravity in a position which causes them to hang in pendulum fashion in the positions indicated; these positions have been found by experiment to offer the least interference and to provide dependable operation. The vertical broken line 60 shown in Figure 3 indicates, at least generally, the direction of the force acting upon the prop when the truck is dropped and the prop contacts the floor. It will be noted that this line passes through the center of stub shaft 45 and that the rounded heel 61 of the prop lies a substantial distance rearwardly beyond line 60. If the truck is dropped and the prop fails to swing to its fully extended limit, the heel will contact the floor rearwardly of line 60, as indicated in broken lines at 62 (Figure 3). In this position, the load force acts in compression from the pivot point through the prop to the contact point of the heel as indicated by the broken line 63, which is angular to the direction of load force, as indicated by line 60. Accordingly, a turning moment is created by the pivot shaft and rounded heel to force the prop by toggle motion rearwardly until the prop rests upon its base, as shown in full lines.

The turning motion of the prop usually creates a forward motion of the truck upon its wheels; however at times a skidding motion of the prop takes place instead, depending upon the frictional resistance of the floor surface and other factors. In any event, experiment has indicated that the prop is extended automatically if the truck is dropped and that the prop ultimately rests upon its flat base whether it swings to that position during downward truck movement or not. It will be understood that the above described action is imparted to both props since they are tied together by the cross bar 37 for movement in unison. When in its final position, the truck is firmly stabilized since the stop elements 43 move into engagement with the side bars to lock the props positively against collapse. It will be obvious that the landing gear also prevents damage to the truck itself. Ordinarily, if the loaded truck falls, the handles 14 contact the floor and the impact springs the side bars out of shape.

Having described my invention I claim:

1. A safety device for a hand truck, the truck having a pair of side bars rising upwardly from a pair of wheels carrying the truck upon a support surface, the truck being balanced upon the wheels by the user in a rearwardly inclined position during transport of the load, said safety device comprising, a pair of props, a respective mounting member projecting from the rearward side of each side bar, pivot means at right angles to the side bar connecting the upper end of each prop to the mounting member, each prop having a generally triangular configuration disposed in a plane parallel to the axis of the side bar, said configuration providing a rearward side, a forward side and a base, said sides converging upwardly to a vertex which is located at said pivot means, said rearward side being longer than the forward side and the base sloping upwardly from the rearward side toward the forward side providing a rounded heel at the juncture of said rearward side and base, the prop suspended by gravity from said pivot means in a generally vertical position, said heel being located rearwardly from the center of gravity of the prop, said prop maintained by gravity in said vertical position independently of the degree of rearward inclination of the truck, said base being disposed above the support surface when the truck is in said rearwardly inclined transport position, and a stop element projecting rearwardly from the vertex portion of the prop below the side bar in a position to engage the side bar, said stop element locking the prop relative to the side bar with the prop disposed generally at right angles to the axis of the side bar, the side bar swinging to said position relative to the prop when the truck is dropped rearwardly from said inclined position, the base of the prop engaging the support surface and supporting the truck in a reclining position with the side bars resting upon said props and elevated above the support surface.

2. A safety device for a hand truck, the truck having a pair of side bars rising upwardly from a pair of wheels which transport the truck upon a support surface, the truck being balanced upon the wheels by the operator in a rearwardly inclined position during transport, said safety device comprising, a pair of generally triangular props, each of said props having a forward leg and a rearward leg, said forward and rearward legs converging upwardly to a vertex, pivot means connecting the vertex of each prop to a respective side bar, the props swinging by gravity in a generally vertical position in a plane parallel to the side bar with the lower ends of the legs disposed above the support surface, the rearward leg of each prop being longer than the forward leg and projecting rearwardly a substantial distance beyond the axis of gravity of the prop, whereby upon dropping the truck rearwardly, the rearward legs contact the support surface and propel the truck forwardly away from the operator, and a stop member on each prop projecting rearwardly therefrom, said stop members engaging the side bars and locking the props at a rearward limit of motion relative to the side bars.

3. A safety device for a hand truck, the truck having a pair of side bars rising upwardly from a pair of wheels which transport the truck upon a support surface, the truck being balanced upon the wheels by the operator in a rearwardly inclined position during transport, said safety device comprising, a pair of generally triangular props, each of said props having a forward leg, a rearward leg, and a base, said forward and rearward legs converging upwardly from the base to a vertex, pivot means connecting the vertex of each prop to a respective side bar, the props swinging by gravity in a generally vertical position, in a plane parallel to the side bar with the base of each prop disposed above the support surface, the rearward leg of each prop being longer than the forward leg and projecting rearwardly a substantial distance beyond an axis of gravity passing through the pivot means, whereby upon dropping the truck rearwardly the rearward legs contact the support surface and propel the truck forwardly away from the operator to bring the base of each prop into contact with the support surface with the props stabilized thereon, and a stop member on each prop projecting rearwardly therefrom, said stop members engaging the side bars and locking the props in said stabilized position.

References Cited in the file of this patent

UNITED STATES PATENTS

| 217,864 | Dolan | July 29, 1879 |
|---|---|---|
| 1,090,501 | Ricker | Mar. 17, 1914 |
| 1,712,485 | Tokita | May 14, 1929 |
| 2,432,368 | Avril | Dec. 9, 1947 |
| 2,589,325 | Bachman | Mar. 18, 1952 |
| 2,598,489 | Bayer et al. | May 27, 1952 |

FOREIGN PATENTS

| 185,067 | Great Britain | Aug. 31, 1922 |